United States Patent [19]

Kobori et al.

[11] Patent Number: 4,543,516

[45] Date of Patent: Sep. 24, 1985

[54] SPEED AND PHASE CONTROL SYSTEM

[75] Inventors: Yasunori Kobori, Yokohama; Kaneyuki Okamoto; Isao Fukushima, both of Katsuta; Masataka Sekiya, Mito; Hideo Nishijima, Katsuta; Kenji Kano, Mito; Tetsuo Sakae, Katsuta, all of Japan

[73] Assignee: Hitachi, Ltd., Tokyo, Japan

[21] Appl. No.: 682,259

[22] Filed: Dec. 17, 1984

[30] Foreign Application Priority Data

Dec. 22, 1983 [JP] Japan .................................. 58-242519

[51] Int. Cl.⁴ ............................................... H02P 5/06
[52] U.S. Cl. .................................... 318/318; 318/314; 318/317; 318/326; 318/327
[58] Field of Search ................. 318/311, 313, 314, 315, 318/316, 317, 323, 326, 327, 329, 332, 341, 345 A, 345 E, 318, 599, 600, 601, 603, 604, 605, 606, 607, 608

[56] References Cited

U.S. PATENT DOCUMENTS

| | | | |
|---|---|---|---|
| 3,110,853 | 11/1963 | Jones | 318/314 X |
| 3,349,308 | 10/1967 | Strand | 318/314 |
| 3,564,368 | 2/1971 | Kelling | 318/341 X |
| 3,950,682 | 4/1976 | Dohanich, Jr. | 318/327 X |
| 4,216,419 | 8/1980 | Van Dam et al. | 318/314 X |
| 4,272,712 | 6/1981 | Beling et al. | 318/314 X |
| 4,298,832 | 11/1981 | Acker et al. | 318/314 X |
| 4,301,395 | 11/1981 | Furuhata et al. | 318/314 |
| 4,311,949 | 1/1982 | Pelkmann et al. | 318/318 X |
| 4,441,061 | 4/1984 | Yoshida et al. | 318/329 |
| 4,476,417 | 10/1984 | Zimmermann | 318/317 X |
| 4,484,235 | 11/1984 | Yokobori et al. | 318/314 X |

Primary Examiner—William M. Shoop, Jr.
Assistant Examiner—Shik Luen Paul Ip
Attorney, Agent, or Firm—Antonelli, Terry & Wands

[57] ABSTRACT

Disclosed is a speed and phase control system for a moving apparatus driven by an electric motor, or the like, and provided with a speed control system for controlling the moving apparatus to an initially set speed, a phase control system for synchronizing the phase of the moving apparatus with a reference signal, and an error correction device storing therein a target value of and for comparing an actual speed or a phase of the moving apparatus with the target value to detect an error therebetween to thereby correct the initially set value in accordance with the error, whereby control is made such that the moving apparatus is operated at the target value of speed and phase thereof. Further, the error correction device is cut off from the speed control system when the speed reaches a value near the target value and at the same time the operation of the phase control system is started.

6 Claims, 11 Drawing Figures

SPEED AND PHASE CONTROL SYSTEM

The present invention relates to a control system for maintaining a moving apparatus such as a rotating apparatus or a traveling apparatus at a predetermined speed and for synchronizing the same with a predetermined reference phase.

In a system for performing phase control in addition to speed control, for example, such as a system for controlling rotation of a video head drum, it is required to control the video head drum to perform accurate and regular rotary movement synchronized with a vertical synchronizing signal. The speed control in such a control system is performed in such a manner that an error of an actually measured value in comparison with a reference value is detected and an initial setting value is corrected in accordance with the quantity of the error so as to automatically perform speed error correction so that the speed is always settled at a reference or target value.

In a control system for performing phase control in addition to such speed control as described above, it is not preferable to always perform speed error correction. This is because if phase control is initiated in the midst of speed error control, the speed of the object to be controlled is deviated by the output of a phase control circuit and the speed error control acts on such a deviated speed, this operation being repeated so that it takes a long time for phase synchronization. Further, if the system is pulled into phase synchronism in a state where the speed has not sufficiently reached the target value on the way of speed control, the rotation is held at the speed which is deviated from the target value and thereafter speed error correction is not be performed because the offset in speed can not be detected. As a result, the output value of error detection by a speed control system shows an erroneous value and a phase control system produces an output cancelling the erroneous error output to perform phase synchronization. Accordingly, even if the phase is synchronized, the synchronization is effected in a state where the phase is deviated from the correct phase position, that is in a state where a phase offset occurs. If such a phase offset occurs, the dynamic range of phase control becomes unbalanced in the direction of negative and positive amplitude of signal so that it is apt to come out of phase synchronization even if a slight disturbance occurs. Such condition is not an optimum controlled state.

In order to overcome such a disadvantage, there is a method in which the phase synchronization control is stopped during the speed error correction. For example, U.S. Pat. No. 4,301,395 discloses a method in which when the rotational speed of the motor exceeds a predetermined value the phase control is started. In this method, however, there is a disadvantage that the phase offset becomes large because the phase synchronization is performed under the condition of existence of the speed offset due to erroneous speed setting, while the period of time required from the beginning of pull into phase synchronism to the completion of synchronization may be shortened.

It is therefore an object of the present invention is to solve the various problems as described above and to provide a control system for a moving apparatus in which the speed error correction is stopped to start the phase control at an optimum timing so that control can be rapidly converged to a target value without any offset in speed as well as in phase.

In order to attain the object, according to an aspect of the present invention, the control system is provided with a speed control device for detecting an actual speed of a moving apparatus to thereby control the moving apparatus to make the actual speed be an initially set predetermined value, a phase control device for detecting a phase position of the moving apparatus to thereby synchronize the phase of the moving apparatus with a reference signal, an error correcting device storing a target value of speed and for detecting an error between the actual speed and the target value to thereby correct the initially set value in accordance with the error, and a change-over device for stopping the error correction when the error becomes a predetermined value and simultaneously starting the phase control.

According to another aspect of the present invention, the control system is provided, in addition to the above-mentioned arrangement according to the first aspect, with a device for detecting an offset in phase of the phase control means, the phase offset detection output of which is applied to the error correction device.

The present invention will be apparent from the following detailed description taken in conjunction with the accompanying drawings, in which:

Figure 1:
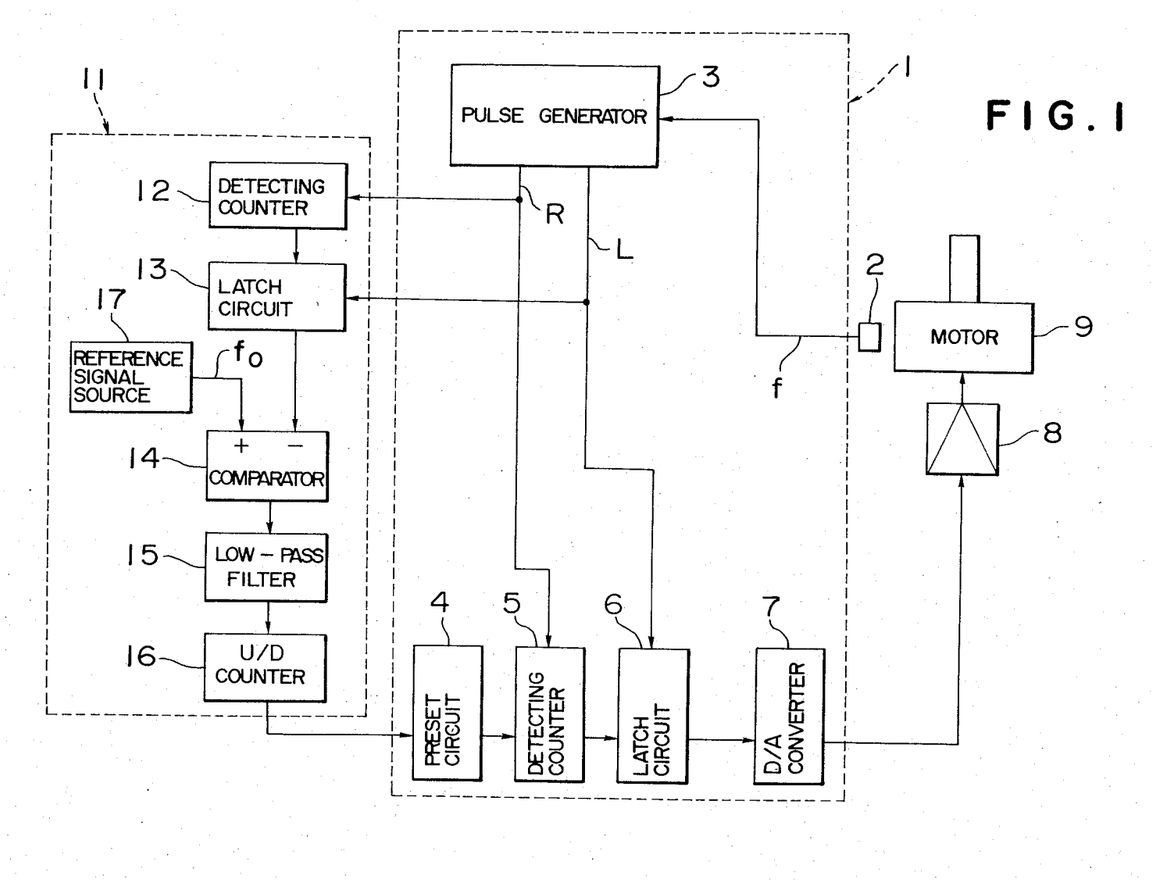
FIG. 1 is a block diagram of a speed control circuit, for explaining the operation of the present invention.

Referring to FIG. 1, an operation of a speed control system will be described hereunder in advance of description as to a preferred embodiment of the present invention.

In FIG. 1, an electric motor which performs rotational movement is shown, by way of example, as a moving apparatus. In the drawing, there are provided a speed control circuit 1, a frequency generator 2, a pulse generator 3, a preset circuit 4, a speed detecting counter 5, a latch circuit 6, a digital-to-analog (D/A) converter 7, a driving amplifier 8, an electric motor 9, a speed error detecting circuit 11, a speed detecting counter 12, a latch circuit 13, a comparator 14, a lowpass filter (LPF) 15, an up/down counter 16, and a speed reference signal source 17.

The operation of this circuit will be described hereinafter. As the motor 9 rotates, a frequency signal f having a frequency proportional to the rotational speed of the motor is produced from the frequency generator 2. The signal f is applied to the pulse generator 3. Upon reception of the signal f, the pulse generator 3 produces a latch pulse L and a preset pulse R, the former being applied to each of the speed counters 5 and 12, and the latter being applied to each of the latch circuits 6 and 13.

In response to generation of the pulse L, the counting data in the detecting counters 5 and 12 are held in the latch circuits 6 and 13 respectively. Immediately after this operation, the detecting counter 5 is preset to an initial setting value determined by the preset circuit 4, and the detecting counter 12 is preset to a predetermined value, for example, zero. Immediately after generation of the reset pulse R, each of the detecting counters 5 and 12 begin to count a clock pulse (not shown).

Through the above-mentioned operations, the detecting counter 12 and the latch circuit 13 are performing an operation of measuring a period of the signal f. The output of the latch circuit 13 is compared with a reference signal $f_0$ from the reference signal source 17, by the comparator 14 on the next stage, to thereby detect a speed error component $\Delta f$ of the signal f. Only a DC component $\Delta f_0$ is detected by the digital LPF 15 on the still next stage. The up/down counter 16 on the next stage becomes its down-counting stage when the state where the sign of $f_0$ does not change for a predetermined period of time, for instance, in the case where $+\Delta f_0$ is maintained the content of the up/down counter 16 changes from its initial value zero to $-1$. Therefore, the initial set value, that is the preset value, $N_0$ stored in the preset circuit 14 is subtracted by 1 (one) so that it becomes $N_0 - 1$.

Subsequently, if the state of $+\Delta f_0$ has continued for a predetermined period of time, the up/down counter becomes the state of downward counting, and the count in the up/down counter 16 become $-2$.

When downward counting is performed in this way, the detecting counter 5 begins to measure the period of the signal f on the basis of the preset values $N_0-1$, $N_0-2$, etc., so that the value latched by the latch circuit 6 becomes smaller and the level of a signal produced from the D/A converter becomes lower. Therefore, the rotational speed of the motor 9 becomes slower, and the period of the signal f becomes longer. That is, the preset value is revised repeatedly till the error component becomes zero.

As the result of repetition of the above-mentioned operations, the state has been reached in which no $\Delta f_0$ is detected, and the frequency of the signal f is coincident with the reference signal $f_0$. That is, the speed of the motor has reached the target value.

Next, referring to FIG. 2 an embodiment of the present invention will be described hereunder.

Figure 2:
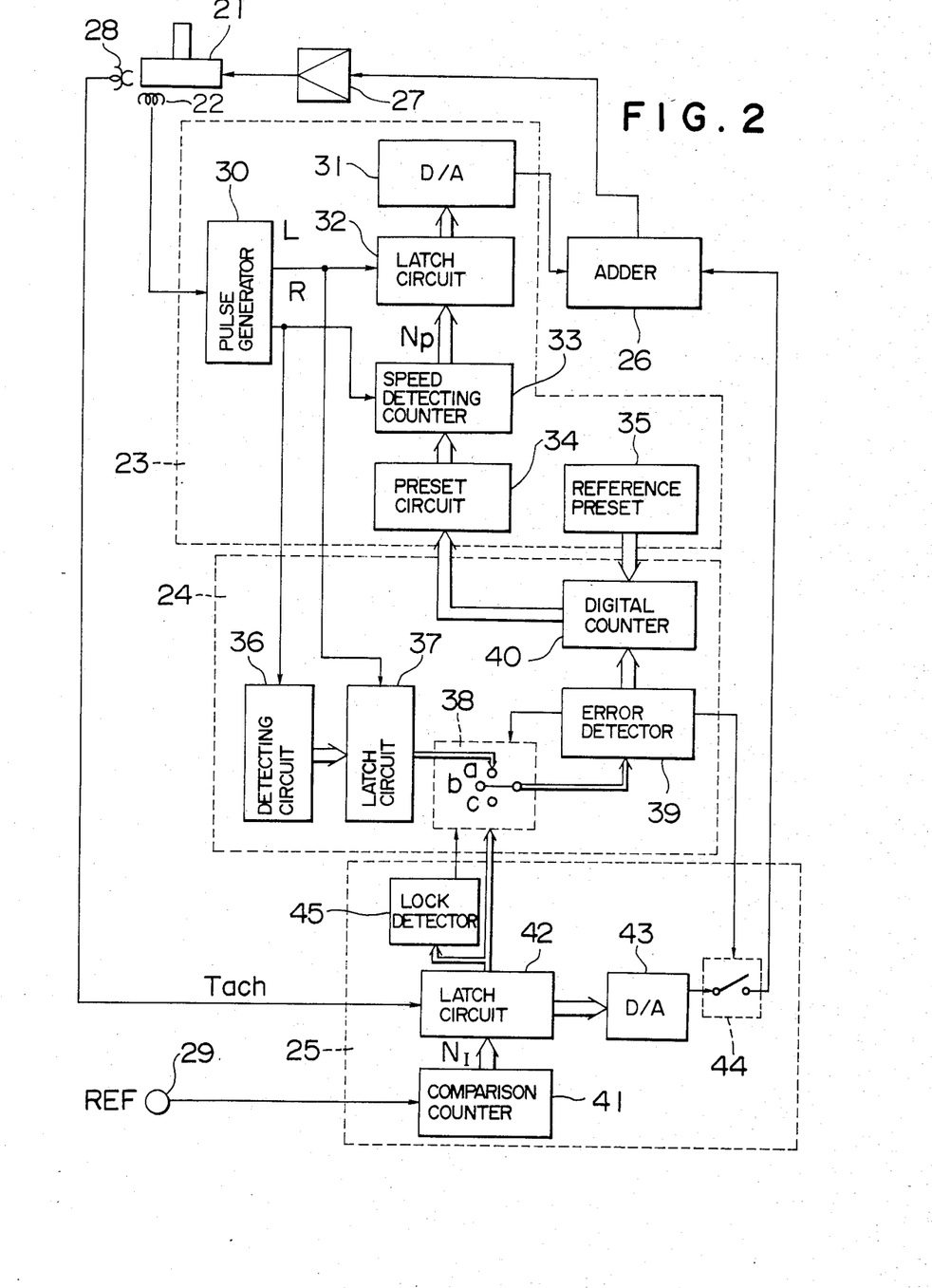
FIG. 2 is a block diagram showing an embodiment of the present invention.

In FIG. 2, there are provided a motor (an object to be controlled) 21, a frequency generator 22, a speed control circuit 23, an error correcting circuit 24, a phase control circuit 25, an adder 26, a motor driving amplifier 27, a phase detector 28, and a phase reference signal input terminal 29. The speed control circuit 23 is constituted by a pulse generator 30, a D/A converter 31, a latch circuit 32, a speed detecting counter 33, a preset circuit 34, and a reference preset value generator 35.

The error correcting circuit 24 is constituted by a speed detecting counter 36, a latch circuit 37, a switching device 38, an error detector 39, and a digital adder 40. The phase control circuit 25 is constituted by a comparison counter 41, a latch circuit 42, a D/A converter 43, a switching device 44, and a phase lock detector 45.

Figure 3:
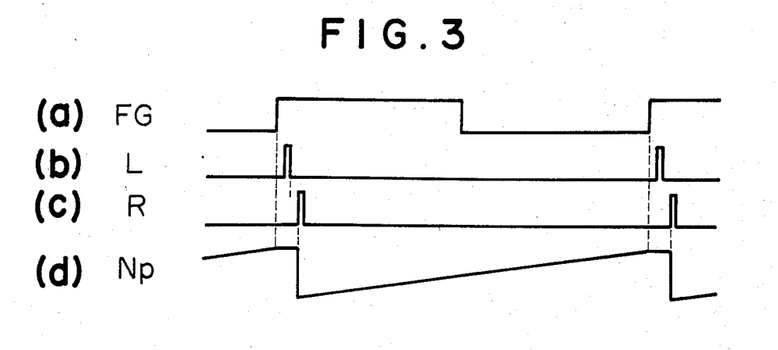
FIGS. 3 to 6 are diagrams showing various waveforms for explaining the operation of the circuit of FIG. 2.

The operation of the embodiment will be described hereunder. Referring to FIG. 3, the operation of the speed control circuit 23 will be first described. On the basis of a signal obtained from the frequency generator 22 (hereinafter referred to as an FG signal), the pulse generator 33 successively produces a latch pulse L and a reset pulse signal R to be applied to the latch circuit 32 and the detecting counter 33, respectively, as shown as the waveforms (b) and (c) in FIG. 3. Thus, the counting data Np of the detecting counter 33 is taken into the latch circuit 32 in response to the latch pulse L, and immediately after that, the detecting counter 33 is reset by the reset pulse R. Then the detecting counter 33 begins to count an applied clock signal (not shown) as soon as the reset pulse R disappears. FIG. 3(d) shows the counted value $NP_P$ in an analog waveform. That is, the ordinate represents the counted value of clock signals.

In the error correcting circuit 24, the counting data from the detecting counter 36 is taken into the latch circuit 37 and applied to the error detector 39 through the switching device (hereinafter abbreviated as "SW") in quite the same way as in the speed control circuit 23. At this moment, the contact a of the SW 38 is closed. The error detector 39 holds therein count data corresponding to a reference target value of the frequency of the FG signal, that is a speed target value, and detects an error between the above-mentioned received data and the reference FG signal frequency, the output thereof being applied to the digital adder 40. The adder 40 adds the reference preset value in the reference preset value generator 35 to the above-mentioned error output and applies the sum to the preset circuit 34. The reference preset value corresponds to the reference FG signal frequency in the error detector 39. The preset value in the preset circuit 34 is increased/decreased in accordance with the error value. That is, the preset value is decreased when the error value has a sign of minus $(-)$, while increased when the sign is plus $(+)$. Thereafter, the same operations as in FIG. 1 are effected.

Thus, during a period of time where the contact a of the SW 38 is closed, the error correcting circuit 24 operates to continue the speed control till the motor speed reaches the target value. During this period, the SW 44 is in its opened state.

Figure 4:
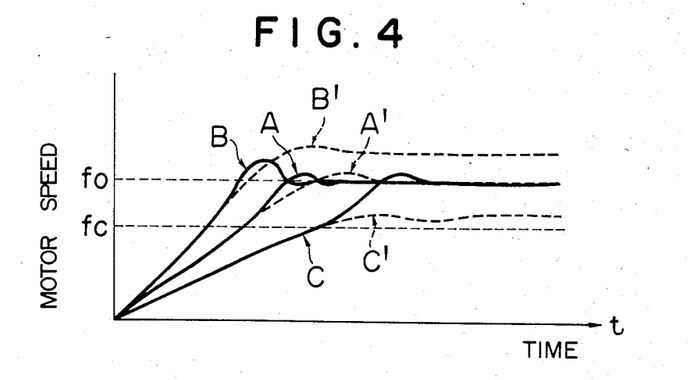

Referring to FIG. 4, the status of speed rising of the motor 21 at that time will be explained. In FIG. 4, the abscissa and the ordinate represents time and the speed (frequency) of the motor 21 respectively. In a conventional system, there are at least three traces of motor speed rising in the state under the condition with no speed control, as shown by dotted curves A' to C' in the same drawing.

If the speed control of the embodiment of the present invention is applied to the system having such traces as described above, the traces change as shown by solid curves A to C in the same drawing. In FIG. 4, $f_0$ represents the normal speed of the motor which is also the target value for the speed correction, and $f_c$ represents a minimum speed capable of being subject to the speed correction.

When the speed correction is performed in the motor in the state of A' in FIG. 4, the state becomes as shown by A. That is, the motor speed rises in the same manner as the case where no correction is effected till the speed has reached the value $f_c'$ and, when the speed $f_c$ is reached, the motor is subject to speed correction in the direction to be accelerated. Then, when the speed becomes over the value $f_0$, the speed correction acts in the direction to decelerate and the motor is rapidly settled to the normal speed.

Similarly, in the motor in the state B' or C', the state changes into B or C of FIG. 4 respectively so that the speed reaches the normal speed $f_0$.

When the motor 21 has been made reach the normal speed $f_0$ by the error correcting circuit 24, the contact b of the SW 38 is closed in response to the instruction from the error detector 39 to cut off the speed error detecting system (loop) and at the same time the SW 44 is closed to cause the phase control circuit 25 to start its operation. Thereafter, the rotation phase of the motor 21 is synchronized with the phase reference signal REF by the phase control. For example, in the case of rotation control for a head drum in a video tape recorder, the phase reference signal REF is a vertical synchronizing signal. Being known well, this method of phase synchronization control will be described briefly hereunder.

Figure 5:
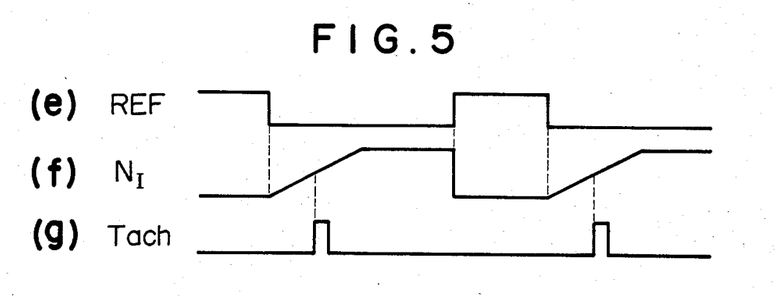

FIG. 5 shows various waveforms for explaining the operation of phase synchronization. The phase reference signal REF is applied to the phase control circuit 25 through the reference signal input terminal 29. $N_f$ represents the output of the comparison counter 44 for counting a clock signal starting from the leading edge of the reference signal REF, and Tach represents an output signal of the phase detector 28. The comparison counter 41 counts a clock signal (not shown) at the timing of each edge of the phase reference signal REF. The pulse Tach is generated when the motor is in a predetermined phase position, the slanting portion of the count $N_f$ is sampled by using the Tach pulse signal as a sampling pulse, and the count is latched in the latch circuit 42. Therefore, the error in phase corresponds to the latched count value. The phase of the pulse Tach has been adjusted to come to the center of the slanting portion of the count $N_f$ when the phase error is zero. The thus obtained phase error signal is changed into an analog voltage signal by the digital-to-analog (D/A) converter 43, applied to the adder 26 through the switch 44, and added to the output of the speed control circuit 23 which has not been subject to speed error correction yet, and applied to the motor driving amplifier 27 so that the motor speed is slightly and transiently changed to control the phase toward the target value. The above-mentioned operation is repeated till the phase synchronization is completed.

By separating the speed error correction by means of the SW 38, it is possible to prevent a possible maloperation of the speed error correction which might be caused by a slight change in motor speed caused by the output of the phase control system entered the speed control system as a disturbance thereto when the phase control circuit 25 operates.

Upon completion of phase synchronization, the contact c of the SW 38 is closed and the error detector 39 begins to detect a phase error. This is performed in order to obviate a phase offset which will be generated when the phase synchronization is started in the state in which a speed offset exists.

Upon detection of the fact that the phase lock is completed, that is the phase has been synchronized with a reference signal REF, the phase lock detector 45 causes the SW 38 to close the contact c, and the data of the latch circuit 42 is applied to the error detector 39 in response to the closure of the contact c. The phase lock detector 45 serves to detect whether a Tach pulse has entered the slanting portion of the count signal $N_f$ in FIG. 5 and may be constituted by means of, for example, a combination of known gate elements.

The term "phase offset" means a stationary offset of phase form a phase reference point, that is, from the center of the slanting portion of the count signal $N_f$, and according to the present invention, also the phase offset is automatically corrected.

Reference data corresponding to this phase reference point is stored in the error detector 39 and compared with the phase data applied from the latch circuit 42 to thereby detect a phase offset value. The thus detected phase offset value is applied as an error signal to the digital adder 40 so as to correct the motor speed to thereby control the motor speed in the direction to make the phase offset zero in the same manner as the speed error correction.

Next, description will be made as to the method of changing-over the mode from the speed error correction to the phase control, that is, the method of determining the timing of closing the SW 44 at the same time when the closed state of the SW 38 is changed over from the contact a to the contact b.

Figure 6:
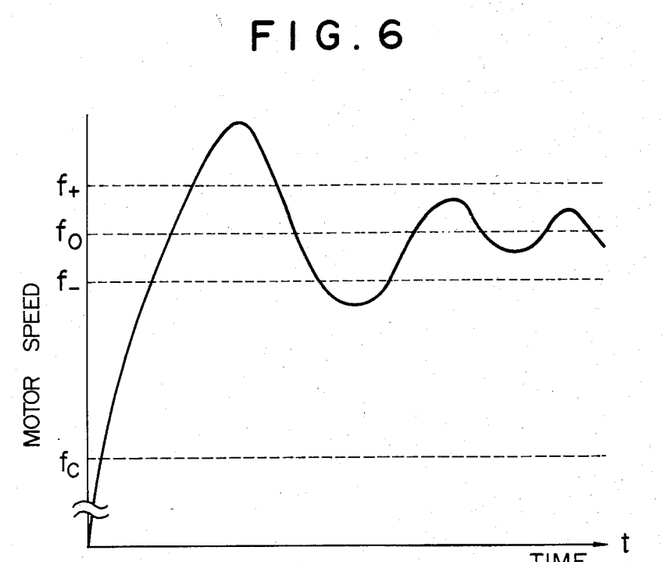

In a first method, there are provided threshold speeds f+ and f− at the opposite sides of the stationary target speed $f_0$ each separated therefrom with a slight speed difference, so that the phase control is performed only when the speed of the motor 21 falls within the range between f+ to f− as shown in FIG. 6. In this method, in the case where the phase control is continuously performed, the speed control system is in the state where the motor speed sufficiently approaches the value $f_0$ so that phase synchronization is effected in the state there is a very little speed offset as well as a little phase offset. According to this method, the operation can be changed over to the phase control after the speed correction has been surely completed by the speed error correction system.

Figure 7:
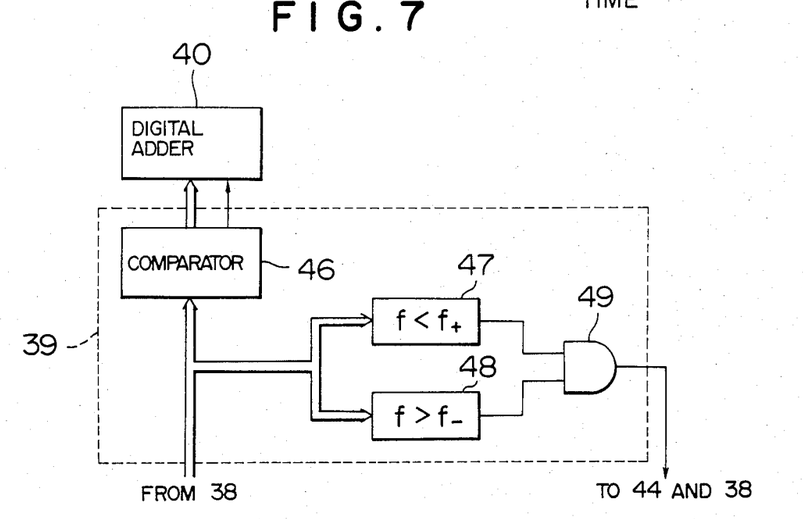
FIGS. 7 and 8 are block diagrams each showing an example of the error detector in FIG. 2.

FIG. 7 shows an example of arrangement of the error detector 39 according to the first method. In the drawing, reference numeral 46 designates a comparator 46 for error detection. The error detection comparator 46 compares received data with a reference value stored therein and produces error data to the digital adder 40. Further, the error detection comparator 46 also detects the rising of the speed of the motor 21 and produces a rising detection signal to the digital adder 40 when it detects the motor speed reaches the value $f_c$. Upon reception of the rising detection signal, the digital adder 40 begins to take in the error data which is an output of the error detection comparator 46. Thus, the error detection comparator 46 serves to operate also as a speed correction initiation signal generating means.

Reference numerals 47 and 48 designate frequency discriminators, the former producing a high level signal when the speed of the motor 21 is smaller than the threshold speed value f+ of FIG. 6, and the latter producing a high level signal when the speed of the motor 21 is larger than the threshold speed value f−. Accordingly, the SW 44 is closed to perform the phase control only when the speed of the motor 21 falls within the range from f− to f+. At this time, the contact b of the SW 38 is closed.

In a second method, aimed at is the fact that the speed of the motor 21 intersects the normal speed $f_0$ alternately downward and upward, as shown in FIG. 6, in the process it is converged to the target value. That is, in this method, the number of times of downwardly intersecting the stationary speed $f_0$ (from the f+ side to the f− side) by the speed of the motor 21 is counted and the phase control is performed after the count has reached a predetermined value. In this method, there are various advantages that no special threshold speed is required, and that the judgement as to whether the f+ side or f− side can be attained only by monitoring the correcting direction of the speed correction. Accordingly, the judging means for changing over the mode can be constituted only by a small number of counters.

Figure 8:
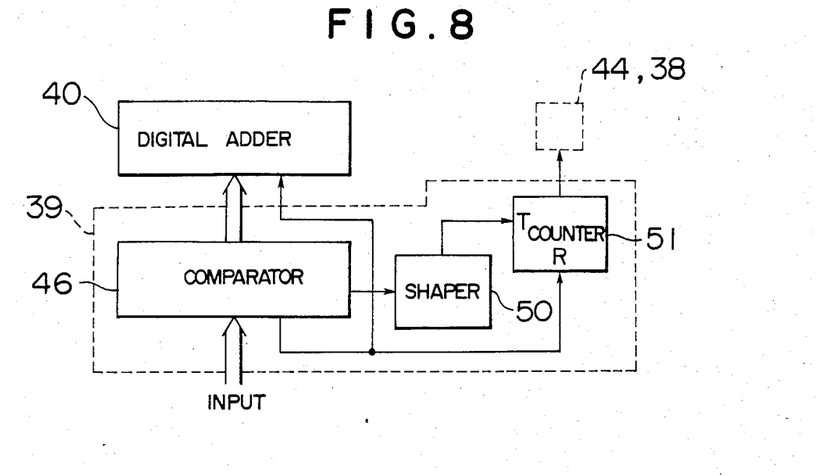

FIG. 8 shows the arrangement of the error detector 39 according to the second method. The error detector 39 is constituted by an error detection comparator 46, a shaper 50, and a timing control counter 51 for determining the timing for effecting phase control system.

Figure 9:
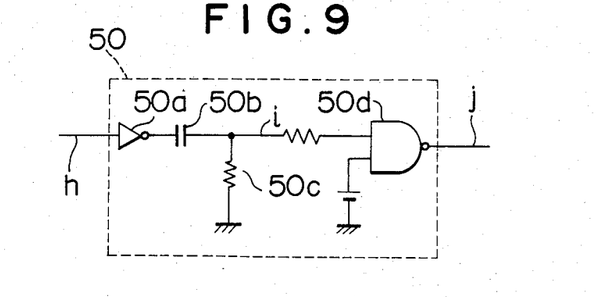
FIG. 9 is a circuit diagram showing an example of the waveform shaping circuit of FIG. 8.
Figure 10:
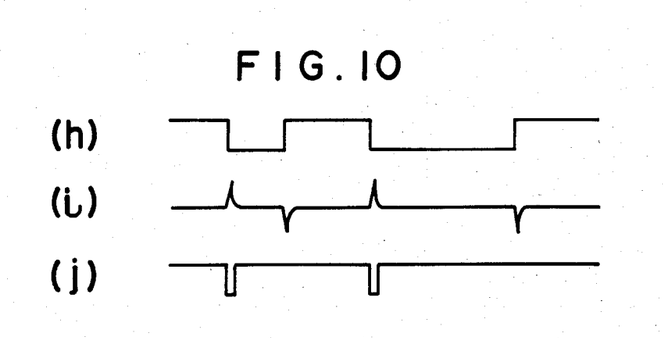
FIG. 10 is a diagram showing waveforms of signals at a main part of the waveform shaping circuit of FIG. 10.

The operation of the circuit of FIG. 8 will be next described. The data measured by the detection counter 36 and the latch circuit 37 (output of the latch circuit 37) is applied to the error detection comparator 46 through the SW 38. The error detection comparator 46 compares the applied data with the reference value (stored in the error detection comparator 46), as described above to produce error data which is applied in turn to the digital adder 40. At the same time, the error detection comparator 46 applies a logic "1" signal and a logic "0" signal to the shaper 50 when the error data is plus (+) and minus (−) respectively. FIG. 9 shows an example of the shaper 50 and FIG. 10 shows waveforms at various portions h to j in FIG. 9. Assuming a signal h, which has a waveform h shown in FIG. 10, is being transferred to the shaper 50 of FIG. 9 in accordance with the polarity or sign of the error, the signal h is reversed by an invertor 50a and differentiated by a differential circuit constituted by a capacitor 50b and a resistor 50c. Thus, the output signal i of the differential circuit has a waveform i as shown in FIG. 10. The signal i is applied to one input terminal of a NAND circuit 50d with its other input terminal supplied with a "1" level signal. Accordingly, the output signal j of the NAND circuit 50d has a waveform j as shown in FIG. 10.

That is, the shaper 50 produces a pulse only when the sign of the error data detected by the error detection comparator 46 changes from positive to negative. The output pulse of this shaper 50 is applied as a sign signal to the trigger input T of the timing control counter 51, and the counter 51 is caused to count up when, for example, the sign signal changes from plus (+) to minus (−) (when the signal changes from the f+ side to the f− side in FIG. 6). In the error detection comparator 46, the rising of speed is also detected as described above and a rising detection signal is produced when the fact that the speed reaches the value $f_c$. This rising detection signal is applied to the reset terminal of the timing control counter 51 to initialize the counter 51. The rising detection signal controls the timing of generation of the output of the error detection comparator 46 and also serves as a speed correction starting signal.

Here, the speed error correction is effected, and the level of the sign signal applied to the timing control counter 51 repeatedly alternates between "1" and "0". Thus, having counted a predetermined value N, the counter 51 issues instructions to cause the SW 44 to close and to cause the SW 38 to change the turn-on connection from the contact a to the contact b. The value of the count value N is determined, generally, on the basis of experiments.

Soon after the SW 44 is closed to perform the phase control, the rotational phase of the motor 21 is phase synchronized with the reference signal REF. Then the contact c of the SW 38 is closed so that the phase comparison data is applied to the error detector 39 to detect a phase offset. It is possible to automatically correct the phase offset by digitally applying correction to the speed in accordance with the quantity of the detected phase offset.

Figure 11:
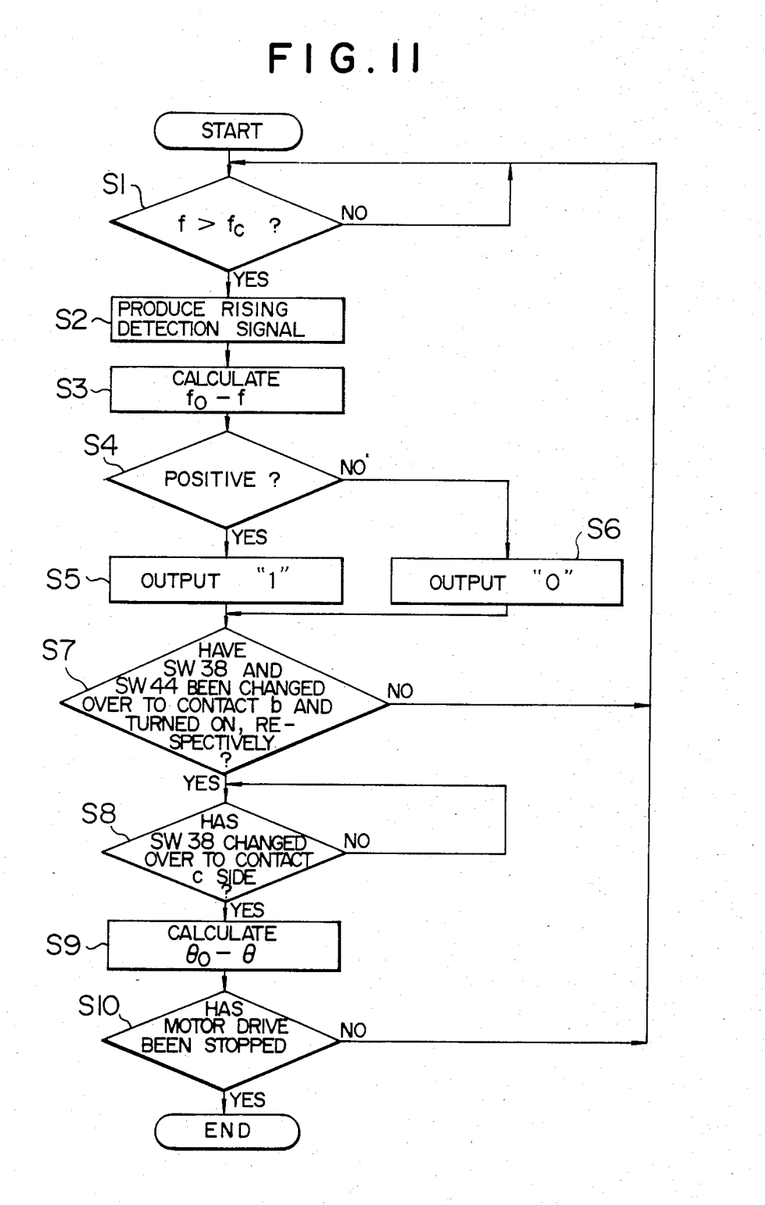
FIG. 11 is a flowchart showing the function of the comparator for error detection.

Referring to FIG. 11, description will be made as to the function of the error detection comparator 46 when the comparator 46 is executed by a microcomputer.

STEP S1: Judgement is made as to whether the speed f of the motor 21 exceeds the rising detection signal $f_c$ or not, and if yes, the operation is advanced to the step S2.

STEP S2, S3: The rising detection signal is produced. The difference between the speed f and the stationary speed $f_0$, that is error data $f-f_0$ is calculated and the error data is taken into the digital adder 40.

STEP S4: Judgement is made as to whether the error data $f-f_0$ is positive or negative, and if yes, the operation is advanced to the step S5, while if no, the operation is advanced to the step S6.

STEP S5: A logic "1" signal is produced.

STEP S6: A logic "0" signal is produced.

STEP S7: Judgement is made as to whether the connection of the SW 38 has been changed over to the contact b and the SW 44 has been turned on or not, and if yes, the operation is advanced to the step S8, while if no, the operation is returned back to the step S1.

STEP S8: Judgement is made as to whether the connection of the SW 38 has been changed over to the contact c, and if yes, the operation is advanced to the step S9.

STEP S9: The error data $\theta_o - \theta$ between the reference phase value $\theta_0$ and applied phase value $\theta$. The error data is taken into the digital adder 40.

STEP S10: Judgement is made as to whether the drive of the motor 21 is stopped or not, and if no, the operation is returned back to the step S1, while if yes, the operation is terminated.

The above-mentioned function of the error detection comparator 46 in the case where the comparator 46 is executed by a microcomputer is only an example and it is possible to modify it in various ways. For example, the respective functions of the switching devices 38 and 44 may be executed by a software, and it is easy for a skilled person in the art to constitute such switching devices by using mechanical switches or semiconductor switching elements. It is a matter of course that the error detection comparator 46 can be constituted by a wired combination of known logic circuit elements. Further, in FIG. 8, lines for transmitting the detection signals representing the state of changeover of the SW 38 and the turning-on of the SW 44 into the error detection comparator 46 are omitted in order to simplify the drawing.

We claim:

1. A speed and phase control system for a moving apparatus driven by a drive source to effect predetermined movement comprising:

speed control means for detecting an actual speed of said moving apparatus to thereby control said moving apparatus to make the actual speed be an initially set predetermined value;

phase control means for detecting a phase position of said moving apparatus to thereby synchronize the phase of said moving apparatus with a reference signal;

error correcting means storing therein a target value of speed and for detecting an error between said actual speed and said target value to thereby correct said initially set value in accordance with said error; and change-over means for effecting a change-over operation to stop the operation of said error correcting means and simultaneously start the operation of said phase control means when said error becomes a predetermined value.

2. A speed and phase control system according to claim 1, in which said error correcting means includes comparator means storing a pair of threshold values slightly separated from said speed target value in the positive and negative directions respectively, said comparator means being arranged to cause said change-over means to effect said change-over operation upon detection the fact that said actual speed reaches a range between said pair of threshold values.

3. A speed and phase control system according to claim 1, in which, said error correcting means includes means for detecting a change in said error in either a positive or negative direction, and counter means for counting the number of occurrence of said change in error and for causing said change-over means to effect said change-over operation when the count reaches a predetermined value.

4. A speed and phase control system for a moving apparatus driven by a drive source to effect predetermined movement comprising:

speed control means for detecting an actual speed of said moving apparatus to thereby control said moving apparatus to make the actual speed be an initially set predetermined value;

phase control means for detecting a phase position of said moving apparatus to thereby synchronize the phase of said moving apparatus with a reference signal;

error correcting means storing therein target values of speed and phase and for detecting speed and phase errors between said actual speed and said target values to thereby correct said initially set value in accordance with said errors;

change-over means for effecting a change-over operation to stop the operation of said error correcting means and simultaneously start the operation of said phase control means when said speed error becomes a predetermined value; and phase synchronization detecting means for producing a detection signal upon detection of completion of the phase synchronization by said phase control means, said change-over means applying a value corresponding to a synchronized phase position to said error correcting means in response to said detection signal of said phase synchronization detecting means.

5. A speed and phase control system according to claim 4, in which said error correcting means includes a comparator means storing a pair of threshold values slightly separated from said speed target value in the positive and negative directions respectively, said comparator means being arranged to cause said change-over means to effect said change-over operation upon detection the fact that said actual speed reaches a range between said pair of threshold values.

6. A speed and phase control system according to claim 4, in which, said correcting means includes means for detecting a change in said error in either a positive or negative direction, and a counter means for counting the number of occurrence of said change in error and for causing said change-over means to effect said change-over operation when the count reaches a predetermined value.

* * * * *